United States Patent
Chen et al.

(10) Patent No.: US 12,331,480 B2
(45) Date of Patent: Jun. 17, 2025

(54) INTELLIGENT DREDGING SYSTEM FOR HIGH-PILED WHARF AND CONTROL METHOD THEREOF

(71) Applicant: Tianjin Research Institute for Water Transport Engineering, Ministry of Transport, Tianjin (CN)

(72) Inventors: Songgui Chen, Tianjin (CN); Jiangnan Chen, Tianjin (CN); Jielong Hu, Tianjin (CN); Zihao Duan, Tianjin (CN); Cheng Peng, Tianjin (CN); Yina Wang, Tianjin (CN); Jun Ma, Tianjin (CN); Yingtao Zhu, Tianjin (CN)

(73) Assignee: Tianjin Research Institute for Water Transport Engineering, Ministry of Transport, Tianjin (CN)

(*) Notice: Subject to any disclaimer, the term of this patent is extended or adjusted under 35 U.S.C. 154(b) by 0 days.

(21) Appl. No.: 18/924,030

(22) Filed: Oct. 23, 2024

(65) Prior Publication Data

US 2025/0043535 A1 Feb. 6, 2025

Related U.S. Application Data

(63) Continuation of application No. PCT/CN2024/076275, filed on Feb. 6, 2024.

(30) Foreign Application Priority Data

Mar. 2, 2023 (CN) .......................... 202310186489.5

(51) Int. Cl.
E02F 5/00 (2006.01)
E02F 3/90 (2006.01)
E02F 3/92 (2006.01)

(52) U.S. Cl.
CPC .............. *E02F 5/006* (2013.01); *E02F 3/907* (2013.01); *E02F 3/9206* (2013.01)

(58) Field of Classification Search
CPC ......... E02F 5/006; E02F 3/8866; E02F 3/907; E02F 3/9206; E02F 5/28; E02F 5/287; E02F 3/902; E02F 3/8808; E02B 3/023
See application file for complete search history.

(56) References Cited

U.S. PATENT DOCUMENTS 2,961,782 A * 11/1960 Wouter ................... E02F 7/065
37/321
4,957,392 A * 9/1990 Bailard ................. E02F 3/8808
405/74

(Continued)

FOREIGN PATENT DOCUMENTS

CN     102995598 A  *  3/2013
CN     106854863 A      6/2017

(Continued)

OTHER PUBLICATIONS

International Search Report issued in corresponding PCT Application No. PCT/CN2024/076275 dated May 20, 2024.

(Continued)

*Primary Examiner* — Matthew Troutman
*Assistant Examiner* — Blake E Scoville
(74) *Attorney, Agent, or Firm* — Pilloff Passino & Cosenza LLP; Rachel Pilloff; Sean Passino

(57) ABSTRACT

An intelligent dredging system for a high-piled wharf and a control method thereof are provided, and the system includes an intelligent monitoring-decision control subsystem and a decentralized high-pressure water disturbance subsystem. The intelligent monitoring-decision control subsystem is composed of a high-precision pile-foundation sediment siltation warning device, a tidal monitoring device and a control terminal. The decentralized high-pressure (Continued)

water disturbance subsystem is composed of a water spraying device, a cable and a multi-loop power distribution device.

1 Claim, 15 Drawing Sheets

(56) References Cited

U.S. PATENT DOCUMENTS

| | | | | |
|---|---|---|---|---|
| 5,285,587 | A | * | 2/1994 | Krenzler ............... E02F 3/8833 37/344 |
| 6,550,162 | B2 | * | 4/2003 | Price .................... E02F 5/28 37/317 |
| 7,621,059 | B2 | * | 11/2009 | McCoy, Jr. ............. E02F 3/907 37/317 |
| 8,522,459 | B2 | * | 9/2013 | Pavan .................... E02F 3/88 37/320 |
| 9,816,240 | B1 | * | 11/2017 | Tesvich ................. G01M 99/00 |
| 2018/0002890 | A1 | * | 1/2018 | Le Guen ............... E02F 3/8866 |

FOREIGN PATENT DOCUMENTS

| | | | | |
|---|---|---|---|---|
| CN | 107905281 | A | * | 4/2018 ............ E02F 3/8808 |
| CN | 111188313 | A | | 5/2020 |
| CN | 111561974 | A | * | 8/2020 ............ E02D 33/00 |
| CN | 211849236 | U | * | 11/2020 |
| CN | 212000870 | U | | 11/2020 |
| CN | 215211228 | U | | 12/2021 |
| CN | 115030254 | A | | 9/2022 |
| CN | 115507798 | A | * | 12/2022 ............ G01B 21/08 |
| CN | 115857565 | A | | 3/2023 |
| KR | 20080032740 | A | | 4/2008 |

OTHER PUBLICATIONS

First Office Action for China Application No. Application No. 202310186489.5, mailed Apr. 3, 2023.
Second Office Action for China Application No. Application No. 202310186489.5, mailed Apr. 19, 2023.
Notification to Grant Patent for China Application No. Application No. 202310186489.5, mailed Apr. 27, 2023.
First Search Report for China Application No. Application No. 202310186489.5, dated Mar. 29, 2023.
Supplementary Search Report for China Application No. Application No. 202310186489.5, dated Apr. 24, 2023.

* cited by examiner

INTELLIGENT DREDGING SYSTEM FOR HIGH-PILED WHARF AND CONTROL METHOD THEREOF

CROSS-REFERENCE TO RELATED APPLICATIONS

This application is a continuation of PCT/CN2024/076275, filed Feb. 6, 2024, and claims priority of Chinese Patent Application No. 202310186489.5, filed on Mar. 2, 2023, the entire contents of which are incorporated herein by reference.

TECHNICAL FIELD

The present disclosure relates to the field of sediment dredging in port terminals, in particular to an intelligent dredging system for a high-piled wharf and a control method thereof.

BACKGROUND

In the eastern sea area of China, there is a serious problem of sediment siltation in the pile wharves of large ports, and the pile foundation damage of the wharves is widespread, and the maintenance cost is expensive. In addition, due to the great difference in bed surface elevation between the front and rear of the pile foundation, some piles are broken at some wharves, which directly affects the safe operation of the wharves. At present, the basic idea of clearing the sediment deposition in the pile wharf is "dredging afterwards", that is, after the sedimentation in the pile wharf, the silted sediment is disturbed by forced disturbance and pumped to the mud barge by dredge pump. For example, the small cutter suction dredging platform commonly used abroad has the advantages such as high dredging efficiency per hour and large excavation depth, but the platform has the disadvantages of short effective operation time and high cost under the wharf. In China, there are also small cutter suction boats used for dredging under the wharf, or diving suction equipment and underwater dredging robots are used. The solution of "dredging afterwards" generally has some problems, such as difficulty in controlling the dredging accuracy, great impact on the surrounding water environment, inadaptability to deep siltation under the wharf, difficulty in climbing the steep slope of siltation, and difficulty in towing the mud conveying pipeline. Therefore, it is urgent to develop an efficient and intelligent dredging system, which may not only ensure the dredging efficiency, reduce the dredging cost, but also have little interference to the wharf water environment.

SUMMARY

The present disclosure provides an intelligent dredging system for a high-piled wharf and a control method thereof. Based on the idea of "dredging beforehand", during the initial stage of sedimentation and before it has reached consolidation, the system uses a distributed high-pressure flushing device to suspend the silted sediment, and takes away the water with high sediment concentration by selecting a reasonable flushing time and utilizing the natural flow of rising and falling tides, so as to finally realize efficient and intelligent dredging under the pile wharf.

In order to achieve the above objective, the present disclosure provides the following solution.

An intelligent dredging system for a high-piled wharf is provided, which includes an intelligent monitoring-decision control subsystem and a decentralized high-pressure water disturbance subsystem; the intelligent monitoring-decision control subsystem is composed of a high-precision pile-foundation sediment siltation warning device, a tidal monitoring device and a control terminal; and the decentralized high-pressure water disturbance subsystem is composed of a water spraying device, a cable and a multi-loop power distribution device.

In some embodiments, the high-precision pile-foundation sediment siltation warning device is composed of single-wave number monitors and a bed surface elevation data storage and processing unit; the tidal monitoring device is composed of tidal monitors and a tidal level data storage and processing unit; the control terminal is composed of a tidal sediment data comprehensive analysis unit and an instruction output unit; and the bed surface elevation data storage and processing unit, the tidal level data storage and processing unit, the tidal sediment data comprehensive analysis unit and the instruction output unit are integrated into the control terminal.

In some embodiments, the water spraying device is composed of a high-pressure submersible pump, a high-pressure water pipe, high-pressure jet spray guns, angle adjusters and annular tracks. The angle adjusters are nested on the annular tracks, and each of the annular tracks surrounds a wharf pile foundation.

In some embodiments, each of the single-wave number monitors and each of the tidal monitors are installed on the wharf pile foundation, and the single-wave number monitors and the tidal monitors transmit data to the control terminal in a wireless transmission manner.

In some embodiments, the multi-loop power distribution device and the control terminal are installed in a control cabinet behind the wharf; and a multi-loop control system is selected for the multi-loop power distribution device, and the instruction output unit controls the multi-loop power distribution device to achieve a control of a starting power and opening-and-closing timing of a water spraying device.

In some embodiments, the high-pressure submersible pump is placed in a water tank with a filter screen behind the wharf; the high-pressure water pipe adopts a stainless steel braided hose; each of the high-pressure jet spray guns includes a spray gun rod, a nozzle and an external protective shell, the spray gun rod is connected to the high-pressure water pipe and the nozzle respectively, and the external protective shell is sleeved on the spray gun rod and connected to each of the angle adjusters.

In some embodiments, each of the angle adjusters includes an annular angle adjuster and a vertical angle adjuster. The annular angle adjuster includes a first stepping motor, a first transmission shaft and multiple balls, the first stepping motor is connected to the first transmission shaft, and the annular angle adjuster is installed on the annular track; and the vertical angle adjuster includes a second stepping motor, a second transmission shaft and movable swing arms, the second stepping motor is connected to the second transmission shaft, and the second transmission shaft is also connected to the movable swing arms, and the movable swing arms are connected to the high-pressure jet spray gun.

The present disclosure further provides a control method of the intelligent dredging system for the high-piled wharf for controlling the intelligent dredging system for the high-piled wharf, including following steps:

monitoring a bed surface at fixed positions through the single-wave number monitors to obtain bed surface data, and transmitting the bed surface data to the bed surface elevation data storage and processing unit;

monitoring a tidal flow direction through the tidal monitors to obtain tidal data, transmitting the tidal data to the tidal level data storage and processing unit, and comprehensively analyzing by the tidal sediment data comprehensive analysis unit to obtain a bed surface elevation and a tidal flow direction law; and when sediment deposition reaches an early warning elevation, starting the multi-loop power distribution device to turn on the water spraying device by the instruction output unit, and controlling the angle adjuster to adjust a spraying angle of the high-pressure jet spray gun, so as to clean sediment within a 360-degree range of the pile foundation.

The present disclosure has following beneficial effects.

In the present disclosure, "compulsory passive dredging" is changed into "preventive active dredging", the intellectualization and high efficiency of silt cleaning are achieved. The intelligent control terminal is used to uniformly deploy the dredging positions and the dredging output power, thereby realizing accurate dredging and energy-saving dredging. The annular track realizes the 360-degree dredging of pile foundation, ensuring the dredging effect and speed. The device may be used for life once installed, and the device is convenient to maintain, greatly saving the cost of dredging. The water body is small in disturbance, the impact on the water environment is small, and the ecological benefit is increased.

BRIEF DESCRIPTION OF THE DRAWINGS

In order to explain the technical solution of the present disclosure more clearly, the drawings needed in the embodiments are briefly introduced below. Apparently, the drawings in the following description are only some embodiments of the present disclosure. For those skilled in the art, other drawings may be obtained according to these drawings without creative effort.

DETAILED DESCRIPTION OF THE EMBODIMENTS

In the following, the technical scheme in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments in the present disclosure, all other embodiments obtained by ordinary technicians in this field without creative work belong to the protection scope of the present disclosure.

In order to make the above objects, features and advantages of the present disclosure more obvious and easier to understand, the present disclosure will be further described in detail with the attached drawings and specific embodiments.

Embodiment 1

Figure 1:
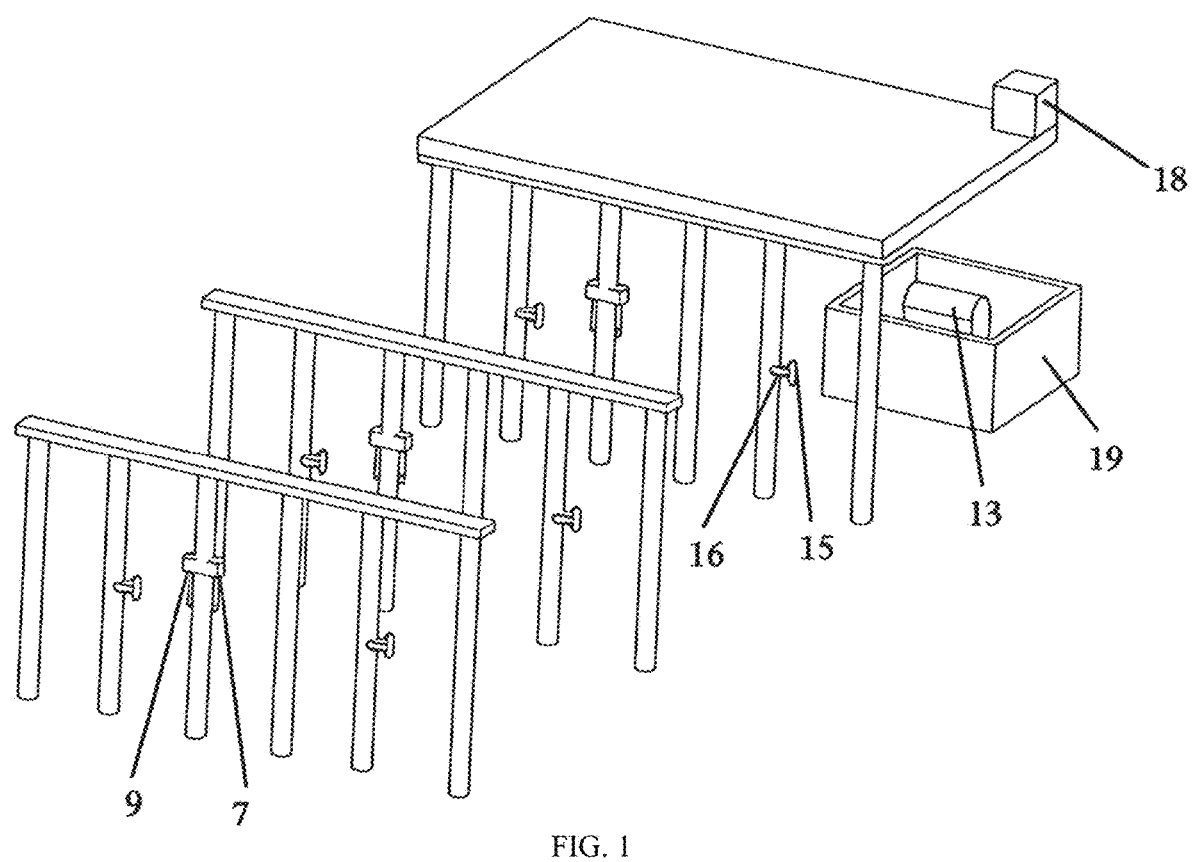
FIG. 1 is a schematic diagram of a system structure according to a first embodiment of the present disclosure.

In this embodiment, as shown in FIG. 1, an intelligent dredging system for a high-piled wharf is provided, which includes an intelligent monitoring-decision control subsystem and a decentralized high-pressure water disturbance subsystem.

Figure 2:
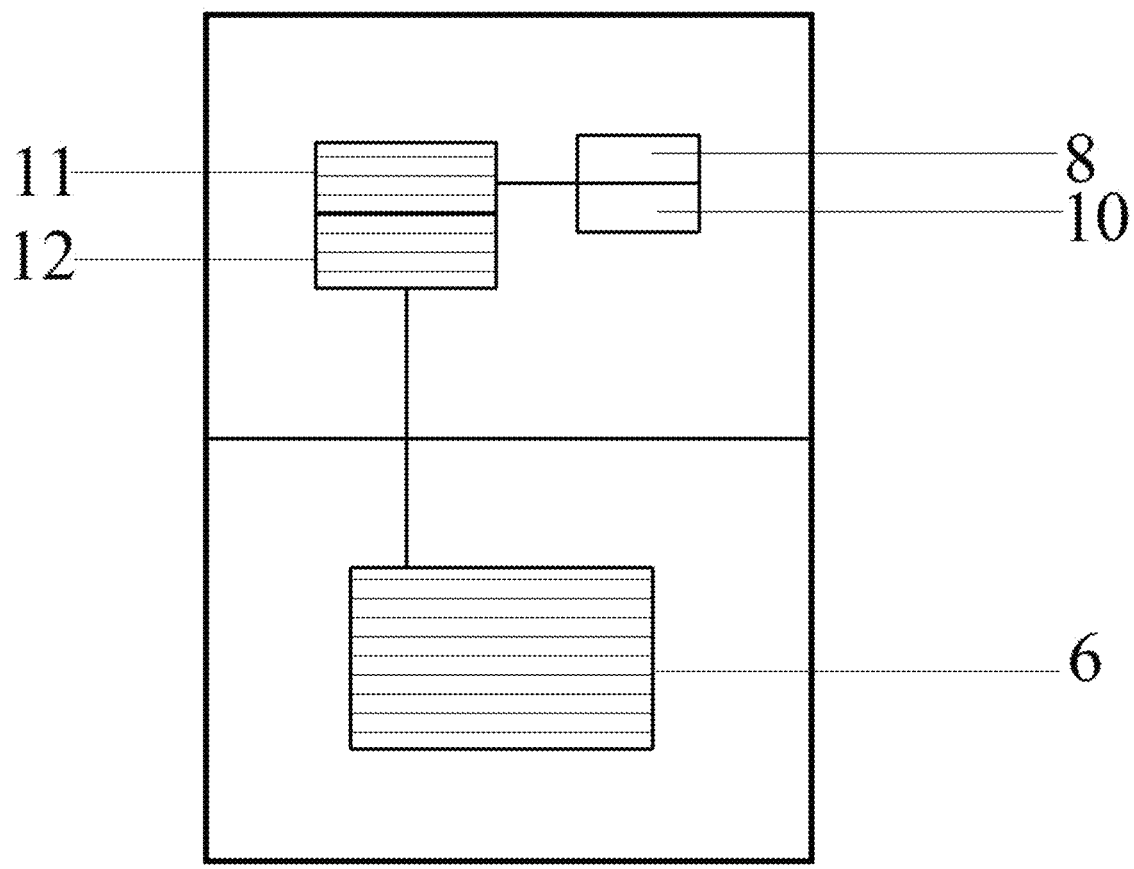
FIG. 2 is a schematic diagram of an intelligent monitoring-decision control subsystem according to the first embodiment of the present disclosure.

As shown in FIG. 2, the intelligent monitoring-decision control subsystem includes a high-precision pile-foundation sediment siltation warning device, a tidal monitoring device and a control terminal. The decentralized high-pressure water disturbance subsystem includes water a spraying device, a cable and a multi-loop power distribution device 6.

The high-precision pile-foundation sediment siltation warning device includes single-wave number monitors 7 and a bed surface elevation data storage and processing unit 8. The tidal monitoring device includes tidal monitors 9 and a tidal level data storage and processing unit 10. The control terminal includes a tidal sediment data comprehensive analysis unit 11 and an instruction output unit 12. And, the bed surface elevation data storage and processing unit 8, the tidal level data storage and processing unit 10, the tidal sediment data comprehensive analysis unit 11 and the instruction output unit 12 are integrated into the control terminal.

Figure 3:
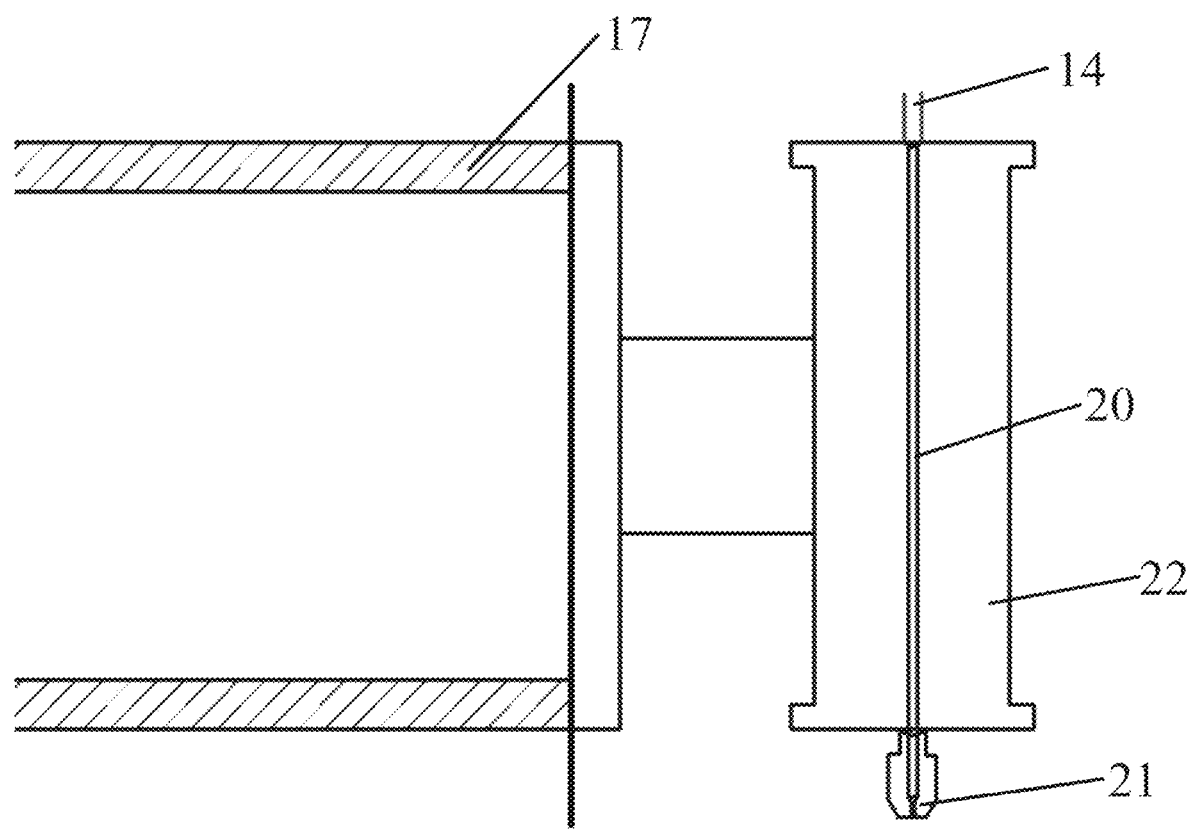
FIG. 3 is a schematic diagram of a high-pressure jet spray gun according to the first embodiment of the present disclosure.

The water spraying device includes a high-pressure submersible pump 13, high-pressure water pipes 14, high-pressure jet spray guns 15, angle adjusters 16 and annular tracks 17. The angle adjuster 16 is nested on the annular track 17, The annular track 17 surrounds a wharf pile foundation. The high-pressure jet spray gun is shown in FIG. 3.

The single-wave number monitor 7 and the tidal monitor 9 are installed on the wharf pile foundation. In this embodiment, the measurement accuracy of the single-wave number monitor 7 is ±10 centimeters (cm), and the single-wave number monitor 7 and tidal monitor 9 transmit data to the control terminal by wireless transmission.

The multi-loop power distribution device 6 and the control terminal are installed in a control cabinet 18 behind the wharf; a multi-loop control system is selected for the multi-loop power distribution device 6, and the instruction output unit 12 controls the multi-loop power distribution device 6, so as to control the starting power and the opening-and-closing timing of the water spraying device.

The high-pressure submersible pump 13 is placed in a water tank 19 with a filter screen behind the wharf. In this embodiment, the high-pressure submersible pump 13 with a power of 7.5 kilowatts (KW) is selected. The high-pressure water pipe 14 is made of a stainless-steel braided hose. The high-pressure jet spray gun 15 includes a spray gun rod 20, a nozzle 21 and an external protective shell 22. One end of the spray gun rod 20 is connected to the high-pressure water pipe 14, and the other end is connected to the nozzle 21. The external protective shell 22 is sleeved on the spray gun rod 20 and connected to the angle adjuster 16.

The annular track 17 includes two circular rings which are sleeved and fixed on the offshore wind power pile foundation The upper surface of each circular ring is provided with an annular sliding groove, and an outer edge of the circular ring is provided with a gear plate. Axes of the annular sliding groove, the gear plate and the offshore wind power pile foundation coincide.

Figure 4:
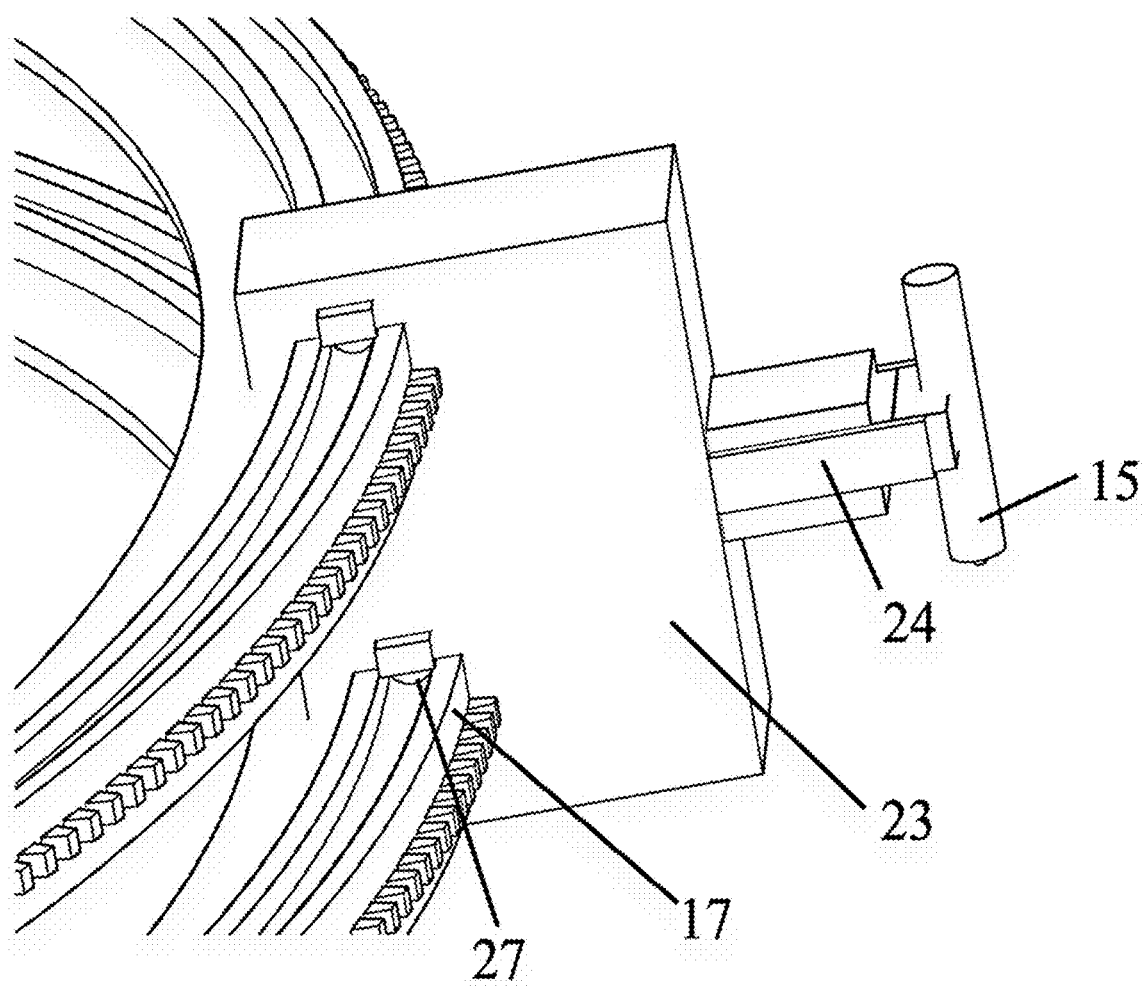
FIG. 4 is a schematic diagram of an angle adjuster according to the first embodiment of the present disclosure.
Figure 5:
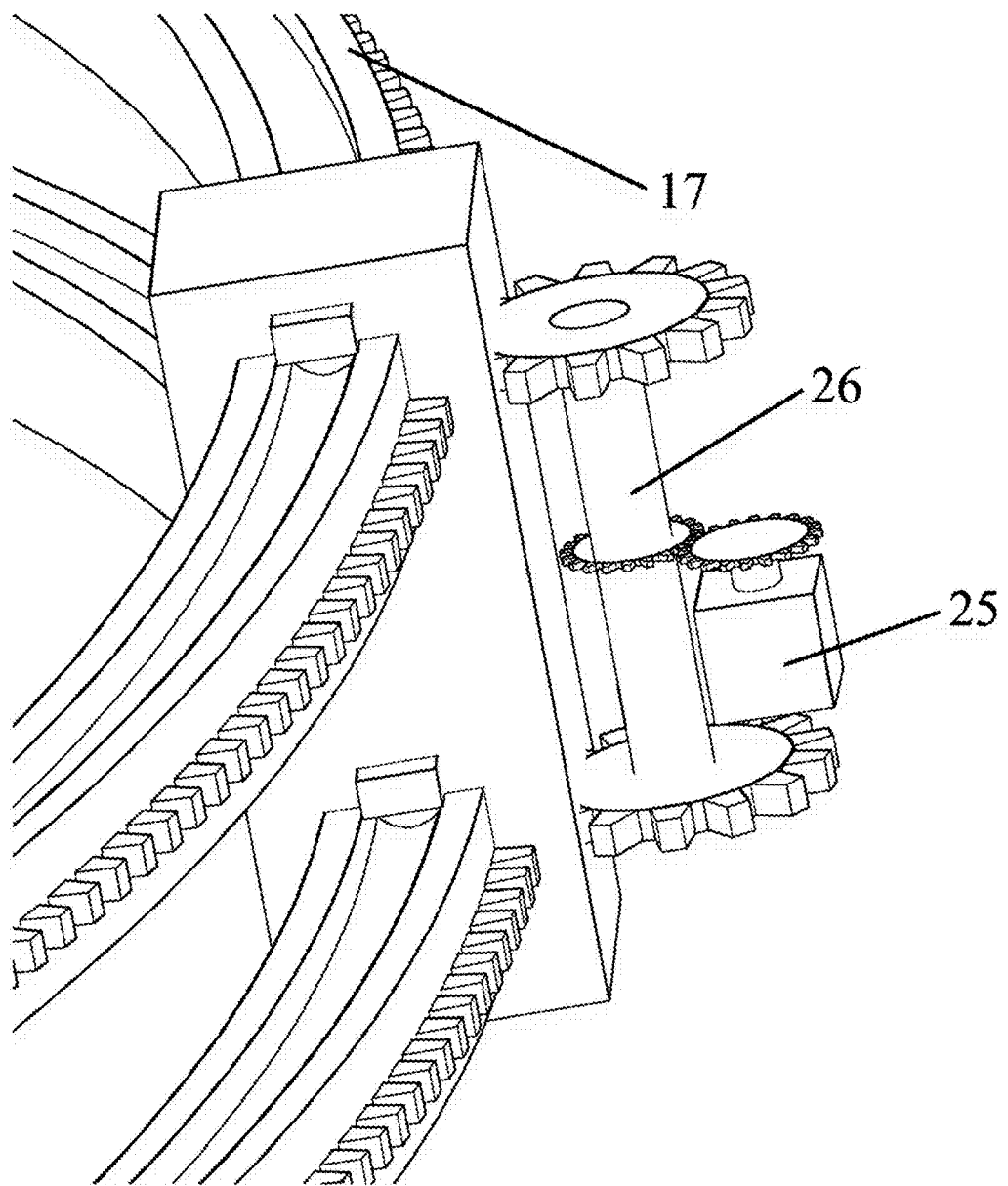
FIG. 5 is a schematic diagram of an annular angle adjuster according to the first embodiment of the present disclosure.

As shown in FIG. 4, the angle adjuster 16 includes an annular angle adjuster 23 and a vertical angle adjuster 24. As shown in FIG. 5, the annular angle adjuster 23 includes a first stepping motor 25, a first transmission shaft 26 and multiple balls 27. The first stepping motor 25 is connected to the first transmission shaft 26, and the annular angle adjuster 23 is installed on the annular track 17. In this embodiment, the middle section of the first transmission shaft 26 is provided with a gear meshing with a gear of the output shaft of the first stepping motor 25, and upper and lower ends of the first transmission shaft 26 are each fixedly connected with a gear. The annular angle adjuster 23 is installed on the two circular rings of the annular track 17, and the gear plates on the two circular rings are respectively meshed with the gears of the upper and lower ends of the first transmission shaft 26.

Figure 6:
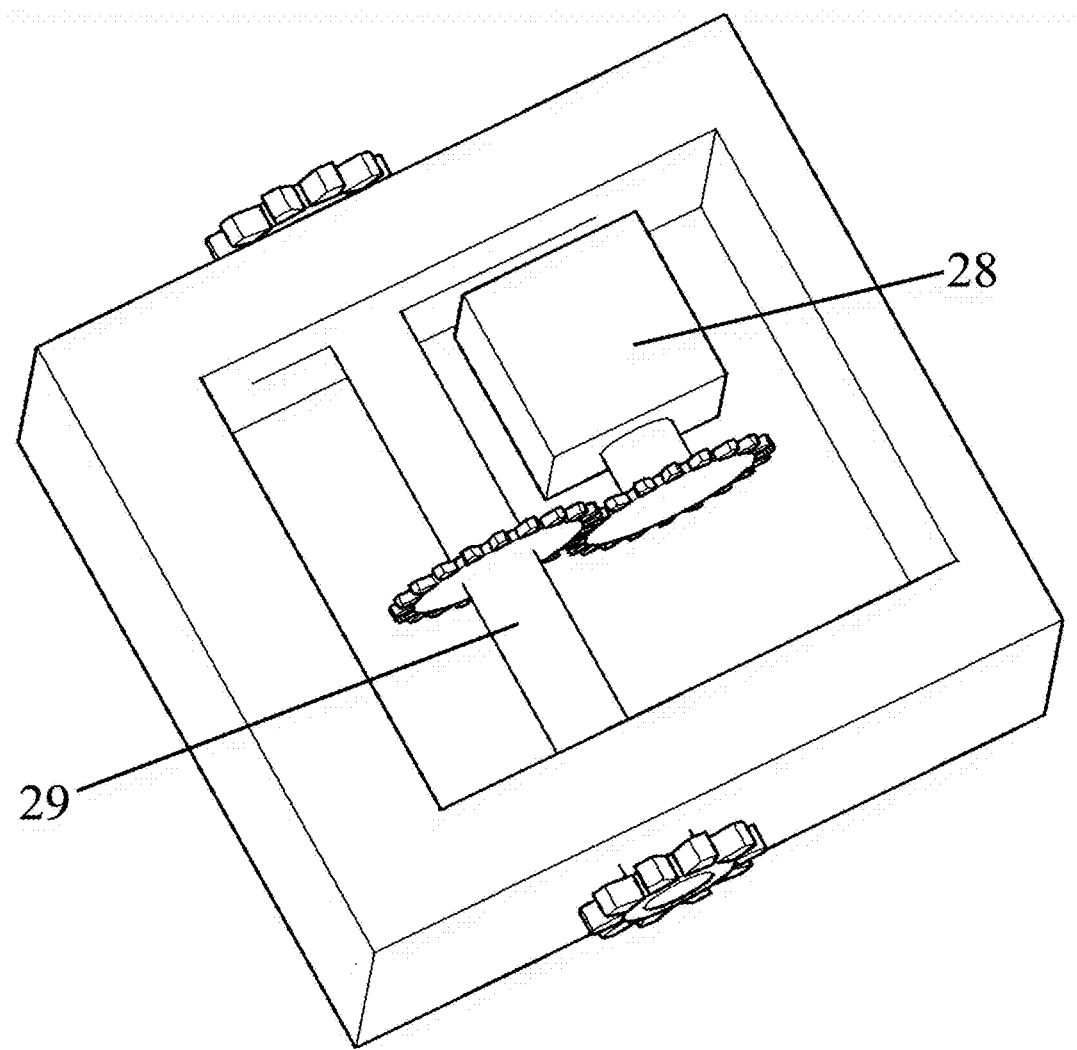
FIG. 6 is a schematic diagram of a vertical angle adjuster according to the first embodiment of the present disclosure.
Figure 7:
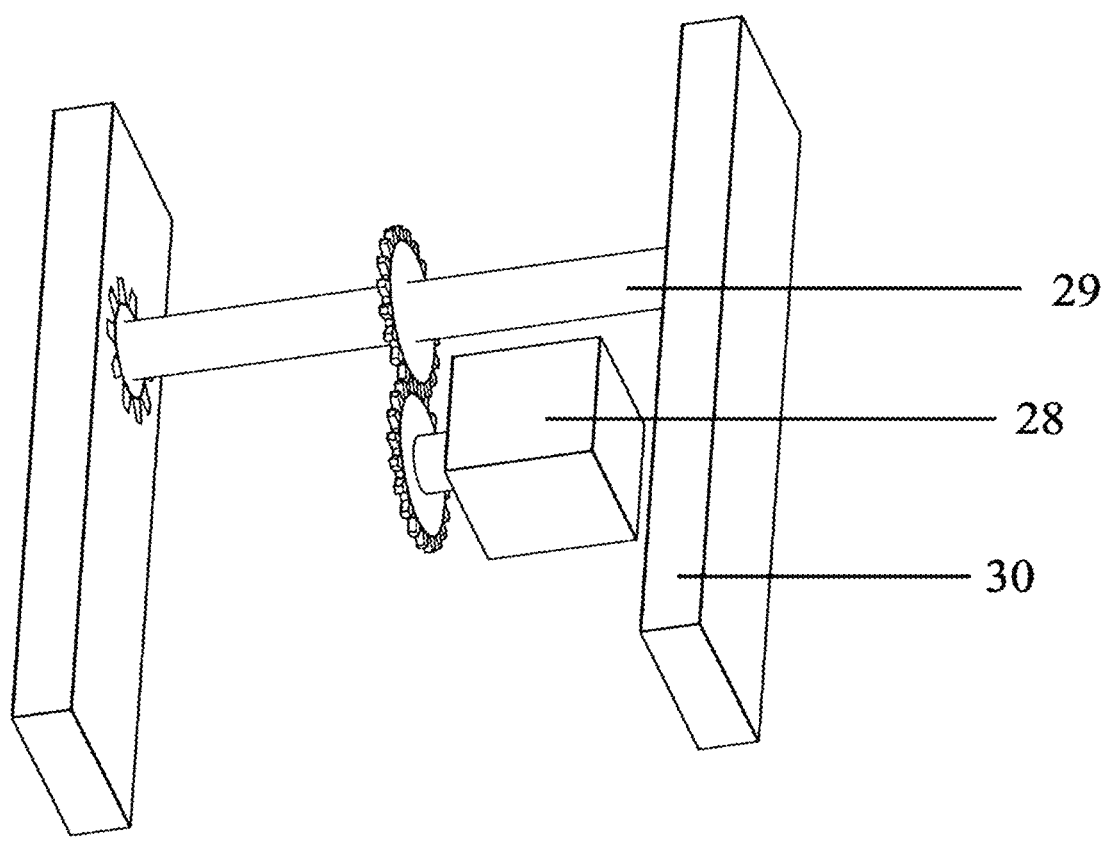
FIG. 7 is a schematic diagram of movable swing arms according to the first embodiment of the present disclosure.

As shown in FIG. 6, the vertical angle adjuster 24 includes a second stepping motor 28, a second transmission shaft 29 and two movable swing arms 30. The second stepping motor 28 is connected to the second transmission shaft 29, the second transmission shaft 29 is further connected to the movable swing arms 30, and the movable swing arms 30 are connected to the high-pressure jet spray gun 15. In this embodiment, the output end of the second stepping motor 28 is equipped with a gear meshing with a gear in the middle section of the second transmission shaft 29. Two protruding ends of the second transmission shaft 29 are fixedly connected to the two movable swing arms 30 respectively, and the movable swing arms 30 are connected to the high-pressure jet spray gun 15. The movable swing arms are shown in FIG. 7.

Embodiment 2

In this embodiment, a control method of the intelligent dredging system for the high-piled wharf is provided, which is used for controlling the intelligent dredging system for the high-piled wharf, and includes following steps.

Figure 8:
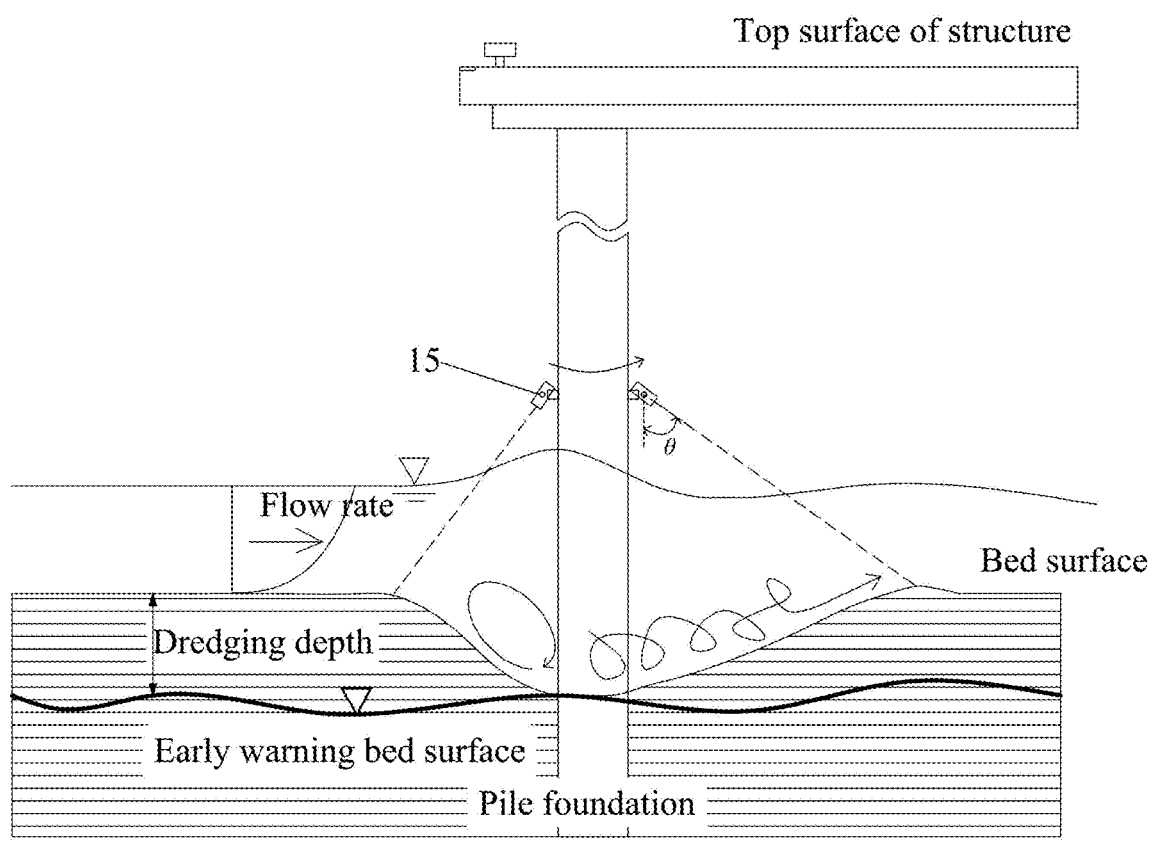
FIG. 8 is a schematic diagram of monitoring work in a second embodiment of the present disclosure.

As shown in FIG. 8, the process of monitoring work is as follows. Firstly, the early warning bed surface elevation value is set, and the seabed surface elevation is monitored by the single-wave number monitor 7. When the bed surface elevation is greater than the early warning bed surface elevation value, the control system comprehensively analyzes the tidal current direction and the bed surface elevation, and starts the high-pressure jet spray guns 15 to dredge the bed surface. When the bed surface elevation drops below the early warning bed surface, the high-pressure jet spray gun 15 is turned off so as to complete the dredging work, and the dredging depth is the bed surface elevation minus the early warning bed surface elevation.

Figure 9:
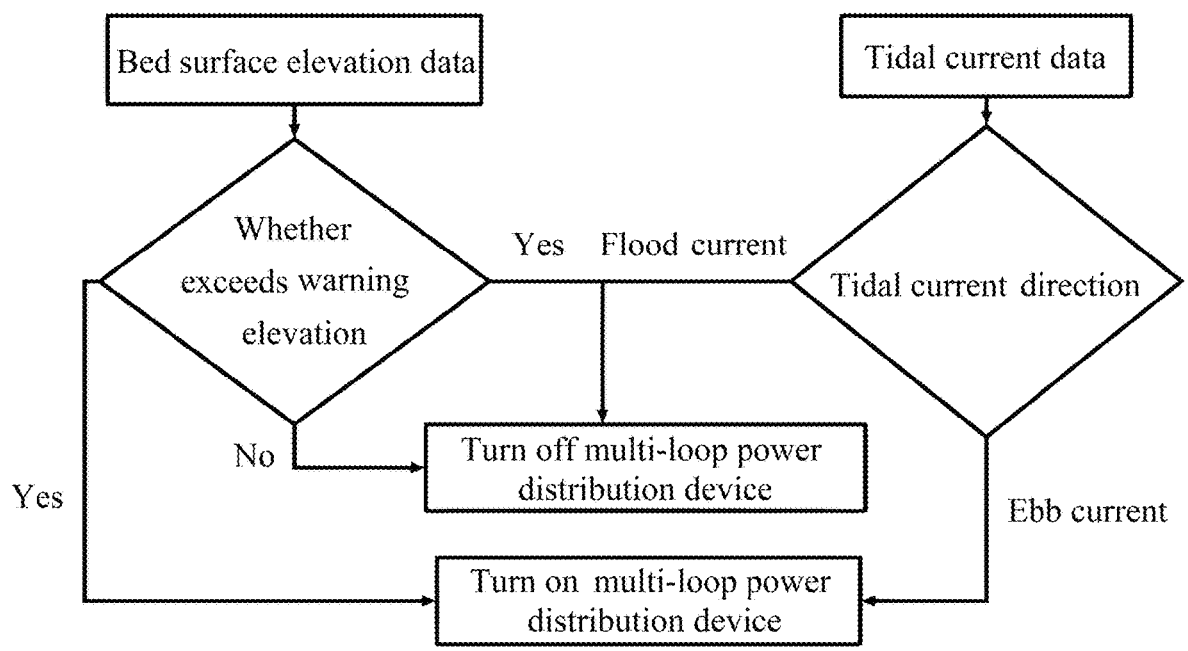
FIG. 9 is a diagram of a comprehensive analysis process of tidal current and sediment data in the second embodiment of the present disclosure.

In this embodiment, a comprehensive analysis process of tidal current and sediment data is shown in FIG. 9. The bed surface elevation data of seabed is obtained by single-wave number monitors 7, and the tidal current direction data is obtained by tidal monitors 9. The multi-loop power distribution device 6 is controlled to be turned on and off by combining the bed surface elevation data and tidal current direction data. When the bed surface elevation is higher than the warning elevation and the tidal current is an ebb current, the multi-loop power distribution device 6 is started to control the high-pressure jet spray guns 15 for dredging, and the suspended sediment is taken away from the port area by the ebb current. In other cases, the multi-loop power distribution device 6 is turned off.

Figure 10:
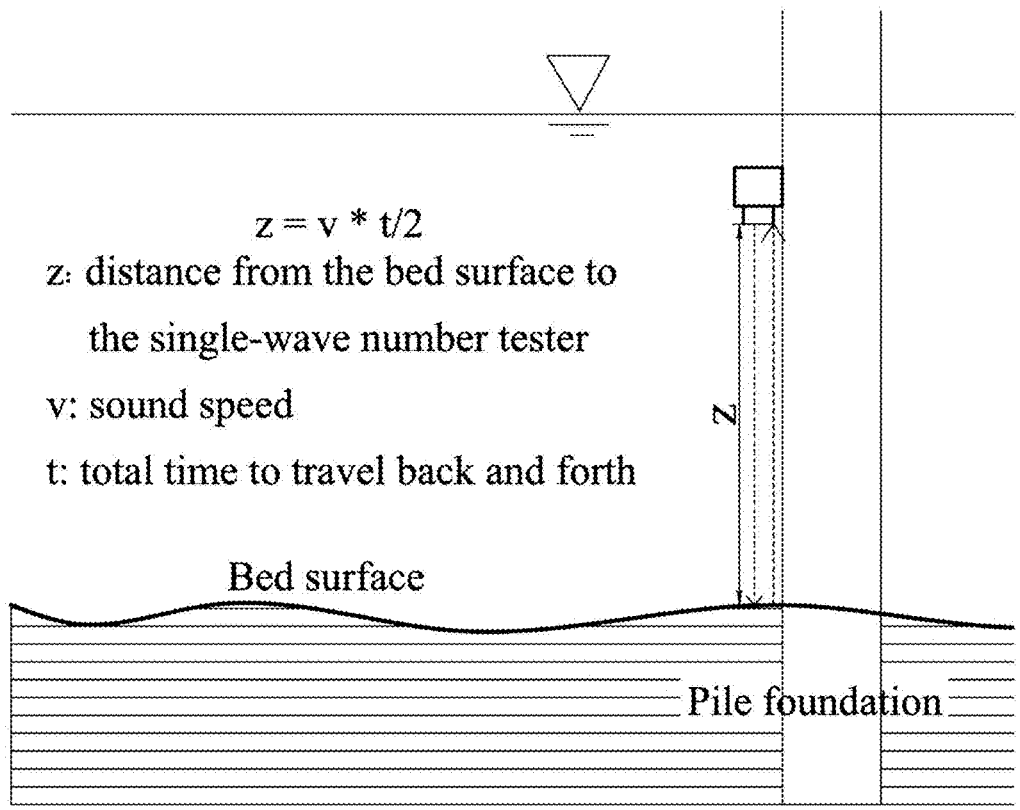
FIG. 10 is a schematic diagram of a bed surface elevation monitoring method according to the second embodiment of the present disclosure.
Figure 11:
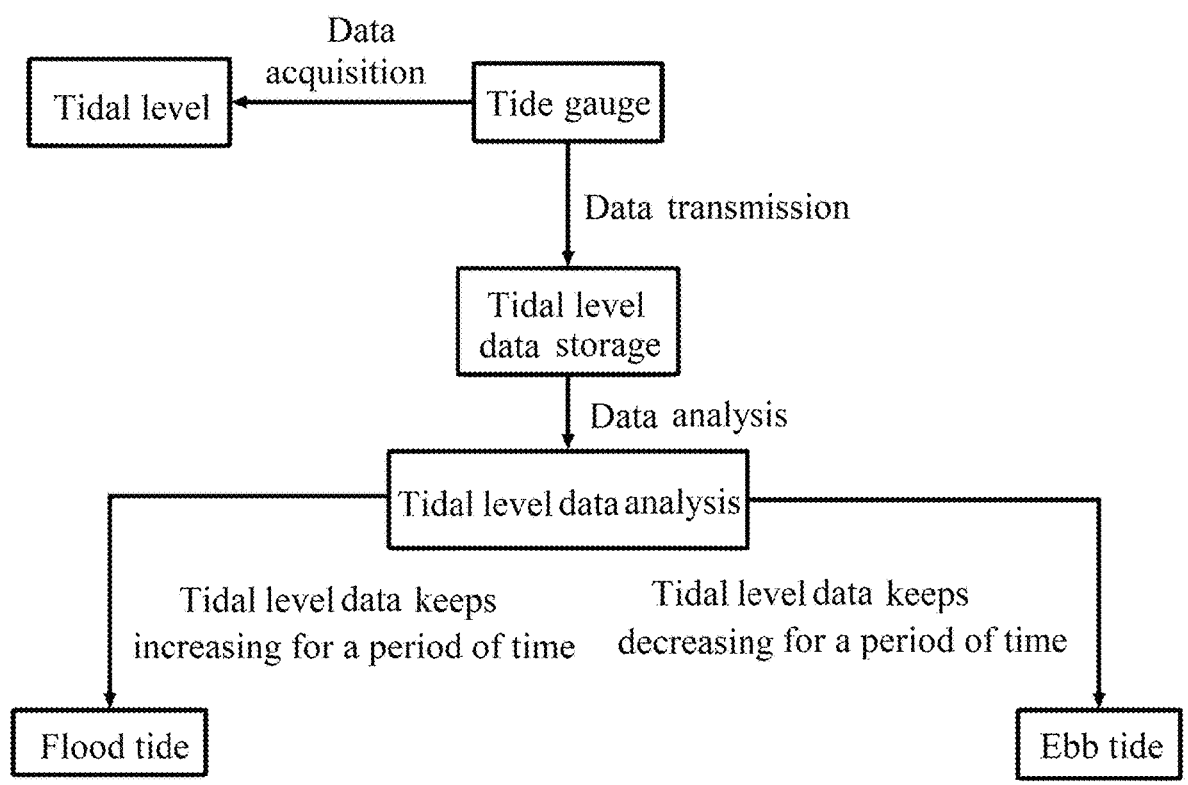
FIG. 11 is a diagram of a tidal current direction monitoring method according to the second embodiment of the present disclosure.

A bed surface elevation monitoring method is shown in FIG. 10. The single-wave number monitor 7 calculates the distance between the bed surface and the single-wave number monitor 7 through the total time of transmitting and receiving ultrasonic waves, and calculates the bed surface elevation according to the elevation of the single-wave number monitor 7. The calculation formula is $z=v*t/2$, where z is the distance between the bed surface and the single-wave number monitor 7, v is the sound speed, and t is the total time for the sound speed to travel back and forth. A tidal current direction monitoring method is shown in FIG. 11. The tidal level data is obtained by a tide gauge, and the tidal current direction is determined according to the change of tidal level data in a period of time. If the tidal level data keeps increasing for a period of time, it is judged as flood tide, and if the tidal level data keeps decreasing for a period of time, it is judged as ebb tide.

Figure 12:
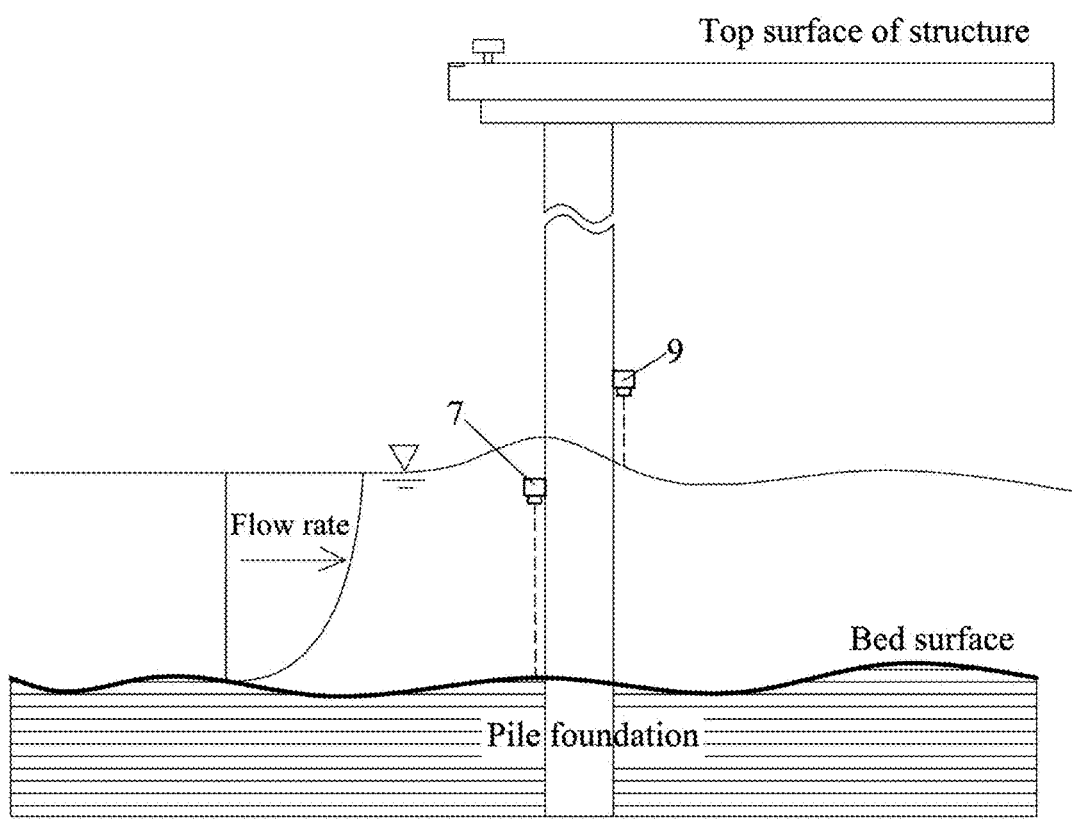
FIG. 12 is a schematic diagram of dredging work in the second embodiment of the present disclosure.

As shown in FIG. 12, the bed surface elevation and flood and ebb data are obtained by the single-wave number monitor 7 and the tidal monitor 9, and the on and off of the multi-loop power distribution device 6 is controlled according to the comprehensive analysis process of tidal current and sediment data, so as to control the start and end of dredging work.

Figure 13:
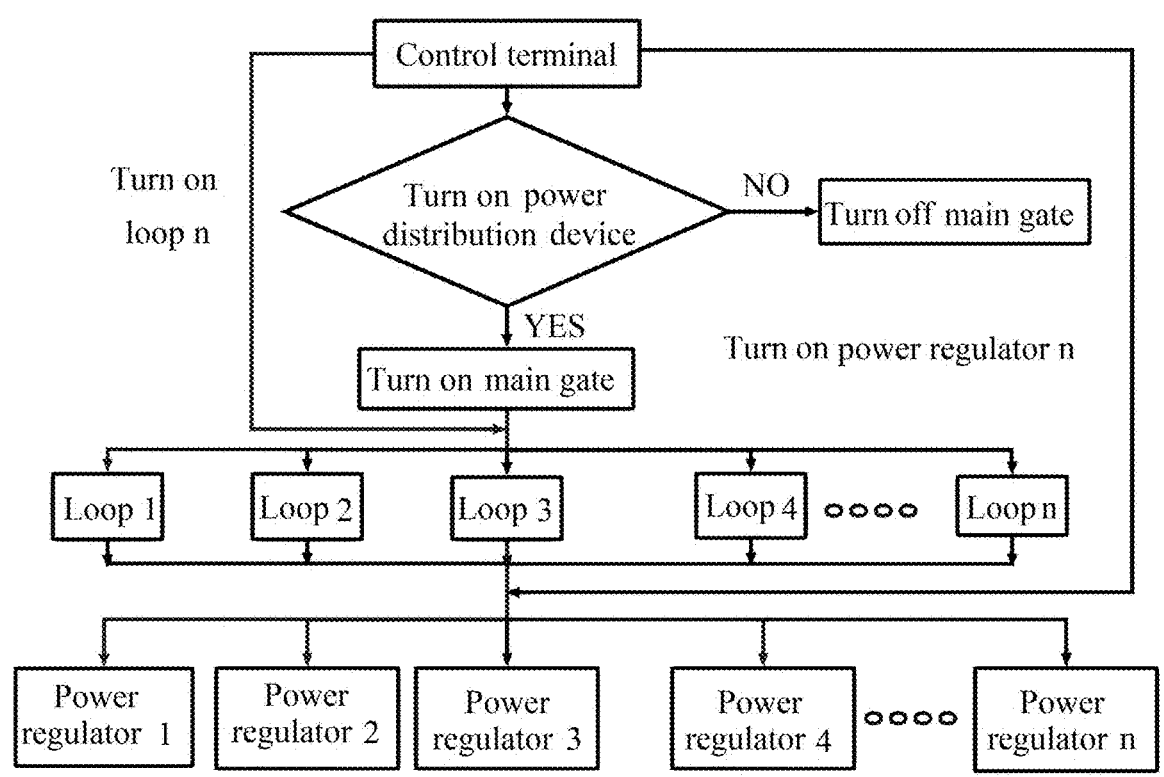
FIG. 13 is a schematic diagram of a multi-loop power distribution device controlling a water spraying device according to the second embodiment of the present disclosure.

As shown in FIG. 13, the control terminal determines whether to turn on the multi-loop power distribution device 6 by comprehensively analyzing the bed surface and tidal current data. When the multi-loop power distribution device 6 is turned off, the main gate is turned off, and when the multi-loop power distribution device 6 is turned on, the main gate is turned on. The control terminal controls the starting of each loop according to the position and area of the siltation, and controls the output power of each loop according to the thickness of the siltation. The greater the siltation thickness, the greater the output power.

Figure 14:
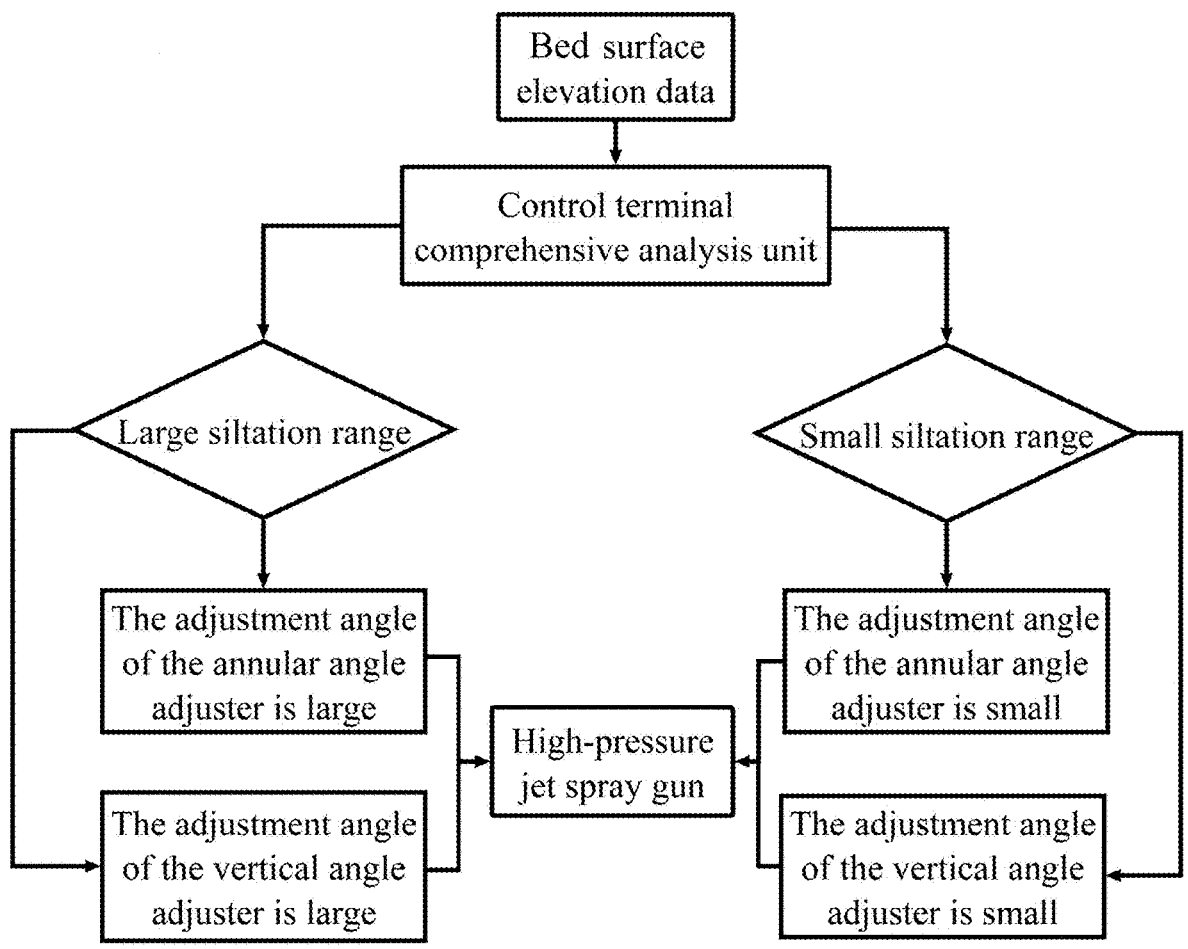
FIG. 14 is an adjustment process diagram of the angle adjuster according to the second embodiment of the present disclosure.
Figure 15:
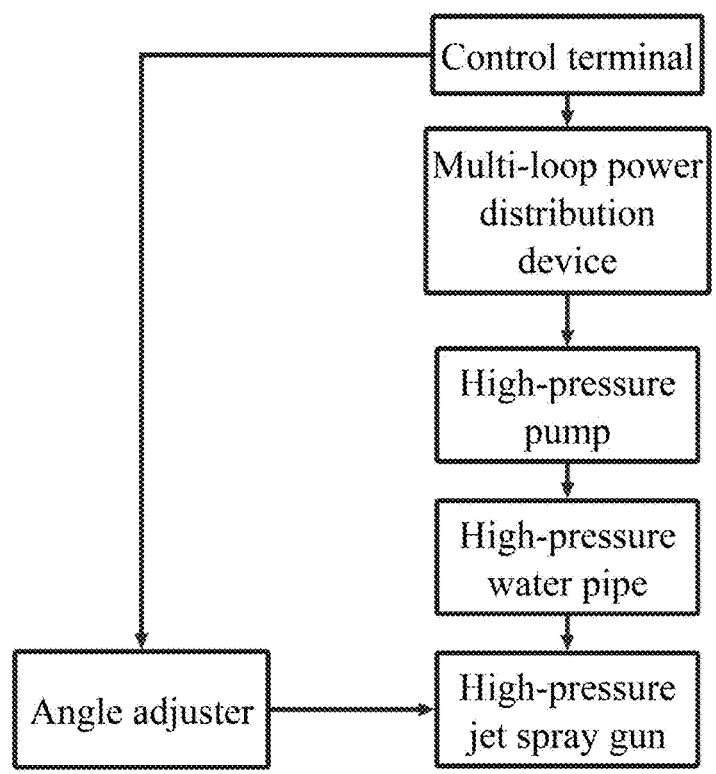
FIG. 15 is a working flow chart of a water spraying device according to the second embodiment of the present disclosure.

In this embodiment, as shown in FIG. 14, the control terminal obtains the siltation position and siltation range through the bed surface elevation data. If the siltation range is large, the annular angle adjuster 23 and the vertical angle adjuster 24 will increase the angle of the high-pressure jet spray gun 15; and if the siltation range is small, the annular angle adjuster 23 and the vertical angle adjuster 24 will decrease the angle of the high-pressure jet spray gun 15. In this embodiment, as shown in FIG. 15, when the control terminal determines that dredging is necessary, the multi-loop power distribution device 6 is turned on and then the high-pressure submersible pump 13 is turned on, and high-pressure water is injected into the high-pressure jet spray gun 15 through the high-pressure water pipe 14. The power of the high-pressure submersible pump 13 is adjusted according to the thickness of the siltation, and the greater the siltation thickness, the greater the power. The injection angle of the high-pressure jet spray gun 15 is controlled according to the siltation range, and the larger the siltation range, the larger the injection angle.

The above-mentioned embodiments are only a description of the preferred implementation of the present disclosure, not a limitation on the scope of the present disclosure. Without departing from the design spirit of the present disclosure, various variants and improvements made by those skilled in the art to the technical solution of the present disclosure shall fall within the protection scope determined by the claims of the present disclosure.

What is claimed is:

1. An intelligent dredging system for a high-piled wharf, comprising: an intelligent monitoring-decision control subsystem and a decentralized high-pressure water disturbance subsystem;

wherein the intelligent monitoring-decision control subsystem comprises a high-precision pile-foundation sediment siltation warning device, a tidal monitoring device and a control terminal;

the decentralized high-pressure water disturbance subsystem comprises a water spraying device, a cable and a multi-loop power distribution device;

the high-precision pile-foundation sediment siltation warning device comprises single-wave number monitors and a bed surface elevation data storage and processing unit;

the tidal monitoring device comprises tidal monitors and a tidal level data storage and processing unit;

the control terminal comprises a tidal sediment data comprehensive analysis unit and an instruction output unit;

the bed surface elevation data storage and processing unit, the tidal level data storage and processing unit, the tidal sediment data comprehensive analysis unit and the instruction output unit are integrated into the control terminal;

the water spraying device comprises a high-pressure submersible pump, a high-pressure water pipe, high-pressure jet spray guns, angle adjusters and annular tracks, wherein the angle adjusters are nested on the annular tracks, and each of the annular tracks surrounds a respective wharf pile foundation;

the high-pressure submersible pump is located in a water tank with a filter screen behind the wharf;

the high-pressure water pipe comprises a stainless-steel braided hose;

each of the high-pressure jet spray guns comprises a spray gun rod, a nozzle and an external protective shell, wherein each spray gun rod is connected to the respective high-pressure water pipe and the respective nozzle, and the external protective shell is sleeved on the spray gun rod and connected to each of the angle adjusters;

each of the angle adjusters comprises an annular angle adjuster and a vertical angle adjuster;

the annular angle adjuster comprises a first stepping motor, a first transmission shaft and a plurality of balls, wherein the first stepping motor is connected to the first transmission shaft, and the annular angle adjuster is installed on the annular track;

the vertical angle adjuster comprises a second stepping motor, a second transmission shaft and movable swing arms, wherein the second stepping motor is connected to the second transmission shaft, and the second transmission shaft is also connected to the movable swing arms, and the movable swing arms are connected to the high-pressure jet spray gun;

each of the single-wave number monitors and each of the tidal monitors are installed on the respective wharf pile foundation, and the single-wave number monitors and the tidal monitors transmit data to the control terminal in a wireless transmission manner;

the multi-loop power distribution device and the control terminal are installed in a control cabinet behind the wharf; and a multi-loop control system is used in the multi-loop power distribution device, and the instruction output unit controls the multi-loop power distribution device to achieve a control of a starting power and opening-and-closing timing of the water spraying device;

wherein the intelligent dredging system for the high-piled wharf is configured to monitor a bed surface at fixed positions through the single-wave number monitors to obtain bed surface data, and transmit the bed surface data to the bed surface elevation data storage and processing unit;

monitor a tidal flow direction through the tidal monitors to obtain tidal data, transmit the tidal data to the tidal data storage and processing unit, and comprehensively analyze using by the tidal sediment data comprehensive analysis unit to obtain a bed surface elevation and determine the tidal flow direction;

obtain bed surface elevation data by the single-wave number monitors, and obtain tidal current direction data by the tidal monitors, and control the multi-loop power distribution device to be turned on and off by combining the bed surface elevation data and the tidal current direction data;

when the bed surface elevation is higher than a warning elevation and a tidal current is an ebb current, start the multi-loop power distribution device to turn on the water spraying device by the instruction output unit, and control the angle adjuster to adjust a spraying angle of the high-pressure jet spray gun, so as to clean sediment within a 360-degree range of each respective wharf pile foundation, and taking suspended sediment away from a port area by the ebb current; and when the tidal current is a flood current, the multi-loop power distribution device remains in an off state.

* * * * *